Patented Apr. 19, 1932

1,855,140

UNITED STATES PATENT OFFICE

RICARDO SANZ, OF BARCELONA, SPAIN

PROCESS FOR THE MANUFACTURE OF BISMUTH OXIDE, BISMUTH CARBONATE, AND OTHER SALTS OF BISMUTH

No Drawing. Application filed September 26, 1927, Serial No. 222,206, and in Great Britain July 7, 1927.

This invention relates to a process for the manufacture of salts of bismuth such as bismuth oxide and bismuth carbonate and has for one of its objects the provision of a method requiring the addition or employment of such substances as would contaminate the resulting products.

Another object of my invention is the provision of an electrolytical process for provision of salts of bismuth from metallic bismuth.

A still further object of my invention is the provision of an electrolytical process for producing salts of bismuth from metallic bismuth which involves employment of inexpensive chemical ingredients.

Other objects will appear hereinafter, the novel features being set forth in the appended claim.

My improved process of producing salts of bismuth from metallic bismuth comprises the passing of a direct current through an electrolyte while using metallic bismuth as an anode and a suitable cathode comprising substances such as carbon, zinc, iron, or aluminum. The electrolytical reactions may be carried on in a container comprising non-corrosive non-metallic material such as glazed earthenware or glass in the presence of an electrolyte comprising a solution of sodium chlorate, sodium acetate, sodium carbonate, sodium nitrate, or potassium nitrate, or any suitable combination of the same. The concentration of the electrolyte may be varied in accordance with the amperage of the electrical current employed for the purpose of obtaining the best and most efficient operating conditions. A solution of sodium chlorate of 3 to 4 percent has been found satisfactory. Before the electrolyte is placed in the container it is preferable to dissolve in the same a quantity of carbonic acid gas.

When the current is passed through the above described electrolyte, oxygen is liberated at the metallic bismuth anode which reacts therewith forming bismuth oxide which is precipitated together with a small quantity of bismuth carbonate which is formed by the reaction of the carbonic-acid gas and some of the bismuth oxide. The salts of bismuth accumulate at the bottom of the vat or receptacle and may be periodically removed, washed, and separated.

If it is desired to produce bismuth carbonate in quantities larger in proportion than bismuth oxide, a continuous flow of carbonic gas may be passed into the electrolyte during the electrolytic reaction for keeping the acidity thereof rather high. The acidity may be maintained by supplying fresh solution to the vat which has been previously supplied with carbonic acid gas with portions of the used solution.

It will be understood that by using the oxide or carbonate of bismuth thus produced it is possible to produce other bismuth salts therefrom by reactions with other chemicals in a well known manner.

It is to be further understood that the percentage of bismuth carbonate in the precipitate resulting from the above described electrolytic reaction may be predetermined by controlling the quantity of carbonic acid gas dissolved in the solution.

Having thus fully described my invention what is desired to be secured by Letters Patent of the United States is:

A method for manufacturing salts of bismuth, consisting of passing an electric current thru a metallic bismuth anode within a container of electrolyte containing carbonic acid gas, simultaneously supplying and drawing electrolyte from said container, injecting carbonic acid gas into the electrolyte before it enters the container, and injecting a continuous flow of carbonic acid gas into the electrolyte during the electrolytic reaction.

In testimony whereof I have affixed my signature.

RICARDO SANZ.